United States Patent
Xu et al.

(10) Patent No.: US 12,276,553 B2
(45) Date of Patent: Apr. 15, 2025

(54) MULTISPECTRAL LIGHT FIELD IMAGING SYSTEM, THREE-DIMENSIONAL TEMPERATURE FIELD MEASUREMENT METHOD AND MEASUREMENT SYSTEM

(71) Applicant: SOUTHEAST UNIVERSITY, Nanjing (CN)

(72) Inventors: Chuanlong Xu, Nanjing (CN); Manfu Chen, Nanjing (CN); Jian Li, Nanjing (CN); Biao Zhang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/897,056

(22) Filed: Sep. 26, 2024

(65) Prior Publication Data

US 2025/0035493 A1    Jan. 30, 2025

Related U.S. Application Data (63) Continuation of application No. PCT/CN2023/128982, filed on Nov. 1, 2023.

(30) Foreign Application Priority Data

Jul. 20, 2023   (CN) .......................... 202310894771.9

(51) Int. Cl.
    *G01K 11/12*     (2021.01)
    *G01K 3/14*      (2006.01)

(52) U.S. Cl.
    CPC ................ *G01K 11/12* (2013.01); *G01K 3/14* (2013.01)

(58) Field of Classification Search
    CPC ................................. G01K 11/12; G01K 3/14
    See application file for complete search history.

(56) References Cited

U.S. PATENT DOCUMENTS

| | | | | |
|---|---|---|---|---|
| 2008/0266655 A1* | 10/2008 | Levoy | ............... | G02B 27/0075 359/368 |
| 2021/0173195 A1* | 6/2021 | Hillman | ............... | G02B 23/04 |

FOREIGN PATENT DOCUMENTS

| | | |
|---|---|---|
| CN | 106908622 A | 6/2017 |
| CN | 107561311 A | 1/2018 |
| CN | 110160660 A | 8/2019 |
| CN | 111426382 A | 7/2020 |
| CN | 111710001 A | 9/2020 |
| CN | 115307732 A | 11/2022 |
| CN | 115575373 A | 1/2023 |
| CN | 116952378 A | 10/2023 |
| KR | 20220001154 A | 1/2022 |

* cited by examiner

*Primary Examiner* — Lee E Rodak
*Assistant Examiner* — Byung Ro Lee
(74) *Attorney, Agent, or Firm* — Bayramoglu Law Offices LLC (57) ABSTRACT

A multispectral light field imaging system includes a primary lens, a microlens array, a first relay lens, a dichroic lens, a second relay lens, a third relay lens, a first image sensor, a first filter, a second image sensor and a second filter, wherein the microlens array is located at an image plane of the primary lens; the first relay lens together with the second relay lens and the third relay lens forms a 1:1 relay lens group imaging system on a spectral band 1 light path and a spectral band 2 light path respectively; the dichroic lens forms an included angle of 45° with a light axis; the first image sensor is located at a focal plane of the second relay lens, and the second image sensor is located at a focal plane of the third relay lens.

15 Claims, 4 Drawing Sheets

__MULTISPECTRAL LIGHT FIELD IMAGING SYSTEM, THREE-DIMENSIONAL TEMPERATURE FIELD MEASUREMENT METHOD AND MEASUREMENT SYSTEM__

CROSS REFERENCE TO THE RELATED APPLICATIONS

This application is the continuation application of International Application No. PCT/CN2023/128982, filed on Nov. 1, 2023, which is based upon and claims priority to Chinese Patent Application No. 202310894771.9, filed on Jul. 20, 2023, the entire contents of which are incorporated herein by reference.

TECHNICAL FIELD

The present disclosure relates to the field of fluid measurement technologies and in particular to high-accuracy measurement of a fluid three-dimensional temperature field.

BACKGROUND

The high-accuracy measurement of the three-dimensional temperature field of the narrow-channel high-temperature gas of the turbines is of great significance for structure optimization and performance improvement of the turbine blades of the aeroengines. But, its complex mechanical structure severely limits the application of the conventional contact flow field measurement technology. In the non-contact flow field temperature measurement technology, the laser-induced phosphorescence temperature measurement technology is a non-contact optical temperature measurement technology based on phosphorescent thermal quenching effect and has the advantages of fewer desired optical windows and flow field non-interference structure and the like and therefore it has good application potential in the complex three-dimensional flow field measurement with optical windows limited. At present, the mature laser-induced phosphorescence temperature measurement methods include an absolute intensity method, a life attenuation method and an intensity ratio method. The intensity ratio method performs temperature measurement based on a relationship of phosphorescent spectral intensity ratio and temperature and is less liable to influence of the factors such as non-uniform distribution of phosphorescent particles than the absolute intensity method and the life attenuation method and thus is applicable to temperature field measurement of dynamic flow fields. The position and the spectral intensity ratio of the phosphorescent tracer particles are used for inversion calculation of the flow field temperature field. Therefore, the multispectral imaging of the phosphorescent particle field and the solving calculation of the spectral intensity ratio are a core part of the flow field temperature measurement.

For the multispectral imaging of the phosphorescent particle field, the laser-induced phosphorescence flow field temperature measurement system mainly employs a conventional imaging mode and can only obtain the multispectral images of the phosphorescent particles within a focal plane. Thus only transient measurement of the flow field two-dimensional temperature field can be achieved but the flow field transient three-dimensional temperature field cannot be obtained. In the computational optical imaging technology, the spectral light field imaging technology can realize collection of the multispectral light field information of the three-dimensional objects through coupling spectrum and light field imaging principle, and also can realize reconstruction of the three-dimensional spectral intensity ratio of the target objects based on tomographic reconstruction algorithm. Therefore, it is expected to realize measurement of the flow field transient three-dimensional temperature field by combination of the spectral light field imaging technology and the temperature measurement technology of the laser-induced phosphorescence intensity ratio method.

Nowadays, the spectral light field camera system structures mainly include a spectral light field imaging system with a primary lens diaphragm aperture of light-field camera coupling a filter array and a spectral light field imaging system with light-field camera image sensor being RGB camera. The spectral light field imaging system of the coupling filter array has the following three problems: 1. since the diaphragm aperture is equally divided by the spectral filters of the filter array, the light field data volume of each spectrum is in inverse proportion to spectrum number; 2. limited by the process conditions of the filter array, multispectral data aliasing is present at the boundary of spectral sub-aperture images of the spectral light field camera, leading to invalidity of the spectral light field data at the sub-aperture image boundary; 3. the larger the distance that the imaging region deviates from the light axis, the larger the aberration of the imaging system; and the size of the spectral sub-aperture images may change depending on change of the position of the imaging region. The spectral light field imaging system coupling color RGB camera has the following problems: the color RGB camera couples a Bayer filter and can only be applied to collection of the multispectral light field data of a specific target, limiting the application scope.

Through search for prior arts, the Chinese invention patent numbered CN201910463400.9 and entitled light-field camera-based multispectral temperature measurement method and system of high-temperature component is found, in which the method uses a spectral light field imaging system with a primary lens diaphragm aperture of light-field camera coupling a filter array, which has the following four problems: 1. while the spectrum number is increased, the light field data volume of the single spectrum is reduced; 2. due to presence of multispectral data aliasing at the boundary of spectral sub-aperture images, part of the image data is invalid; 3. due to influence of the aberration, the size of the spectral sub-aperture images may change depending on change of the position of the imaging region; 4. since the multispectral light field information is imaged on a same image sensor, the spectral data processing method is complicated and the data processing flow is tedious.

For the solving calculation of the phosphorescent spectral intensity ratio, in order to achieve measurement on the laser-induced phosphorescence flow field two-dimensional temperature field, it is only required to obtain a ratio of the multispectral images of the phosphorescent particles pixel by pixel so as to obtain a two-dimensional planar phosphorescent spectral intensity ratio. In order to calculate the spectral intensity ratio of the three-dimensional phosphorescent particle field based on the spectral light field images, it is firstly required to reconstruct the distribution of each spectral intensity of the three-dimensional phosphorescent particle field based on tomographic reconstruction algorithm, and then by the method of obtaining the ratio voxel by voxel, the spectral intensity ratio of the three-dimensional phosphorescent particle field is calculated.

Through search for prior arts, the Chinese invention patent numbered CN201710562875.4 and entitled three-dimensional flow field test method based on double light field camera is found. In the invention, by obtaining an intersection of solutions, the stretching effect of the reconstruction result is weakened. But, one light field camera system is to be added in the invention, leading to more desired optical windows. Therefore, it is not applicable to the complex three-dimensional flow field measurement with optical windows limited.

SUMMARY

The first problem to be solved by the present disclosure is to provide a multispectral light field imaging system with light field data volume of each spectrum unchangeable.

The second technical problem to be solved by the present disclosure is to provide a three-dimensional temperature field measurement method and system with small intensity reconstruction error and high reconstruction quality.

In order to solve the above technical problems, the present disclosure employs the following technical solution.

The present disclosure provides a multispectral light field imaging system, including a primary lens, a microlens array, a first relay lens, a dichroic lens, a second relay lens, a third relay lens, a first image sensor, a first filter, a second image sensor and a second filter, wherein the microlens array is located at an image plane of the primary lens; a distance between the first relay lens and an equivalent plane of the microlens array is f+F, wherein f refers to a focal length of the microlens array, and F is a focal length of the first relay lens; the first relay lens together with the second relay lens and the third relay lens forms a 1:1 relay lens group imaging system on a spectral band 1 light path and a spectral band 2 light path respectively; the dichroic lens forms an included angle of 45° with a light axis; the first image sensor is located at a focal plane of the second relay lens, and the second image sensor is located at a focal plane of the third relay lens.

The present disclosure provides a laser-induced phosphorescence flow field three-dimensional temperature field measurement method, including:

obtaining light field images collected by the first image sensor and the second image sensor respectively;

based on the obtained light field images, obtaining a three-dimensional spectral intensity distribution corresponding to the light field images;

based on the obtained three-dimensional spectral intensity distribution, obtaining a three-dimensional temperature distribution by intensity ratio method.

Based on the obtained light field images, obtaining the three-dimensional spectral intensity distribution corresponding to the light field images includes:

Based on the obtained light field images, the established correspondence equation set of position of target object, spectral intensity of target object, and light field image is as shown below:

$$b^{\lambda}_{(m,n)} = \sum_{(1,1,1)}^{(Ni,Nj,Nk)} a^{\lambda}_{(m,n),(i,j,k)} x^{\lambda}_{(i,j,k)} \quad (1)$$

wherein $b^{\lambda}_{(m,n)}$ refers to a gray value of pixel (m,n) of $\lambda$ spectral light field images, $\lambda$ refers to a spectral wavelength, (m,n) refers to a pixel coordinate, $x^{\lambda}_{(i,j,k)}$ refers to a $\lambda$ spectral intensity value of the (i,j,k) voxel, (i,j,k) refers to a voxel coordinate; $a^{\lambda}_{(m,n),(i,j,k)}$ refers to a ratio of a gray contribution value of the voxel (i,j,k) for the pixel (m,n) to a $\lambda$ spectral intensity value of the voxel (i,j,k), which is also called weight coefficient;

three-dimensional discrete voxels of a control body are rearranged into a voxel column vector in an order of "row, then column and then vertical", and thus any original discrete voxel (i,j,k) is numbered (k−1)·I·J+(j−1)·I+i in the rearranged column vector; two-dimensional discrete pixels of the light field images are rearranged into a pixel column vector in an order of "row and then column" and thus any original pixel (m,n) is numbered (n−1)·M+m in the rearranged pixel column vector; r=(n−1)·M+m, c=(k−1)·I·J+(j−1)·I+i, R=M·N, C=I·J·K are obtained and thus a correspondence between voxel column vector of control body and pixel column vector of light field image is expressed as below:

$$\begin{bmatrix} a^{\lambda}_{1,1} & a^{\lambda}_{1,2} & a^{\lambda}_{1,3} & \cdots & \cdots & \cdots & a^{\lambda}_{1,C} \\ a^{\lambda}_{2,1} & a^{\lambda}_{2,2} & a^{\lambda}_{2,3} & \cdots & \cdots & \cdots & a^{\lambda}_{2,C} \\ a^{\lambda}_{3,1} & a^{\lambda}_{3,2} & a^{\lambda}_{3,3} & \cdots & \cdots & \cdots & a^{\lambda}_{3,C} \\ \vdots & \vdots & \vdots & \ddots & \cdots & \cdots & \vdots \\ \vdots & \vdots & \vdots & \vdots & a^{\lambda}_{r,c} & \cdots & \vdots \\ \vdots & \vdots & \vdots & \vdots & \vdots & \ddots & \vdots \\ a^{\lambda}_{R,1} & a^{\lambda}_{R,2} & a^{\lambda}_{R,3} & \cdots & \cdots & \cdots & a^{\lambda}_{R,C} \end{bmatrix} \square \begin{bmatrix} x^{\lambda}_1 \\ x^{\lambda}_2 \\ x^{\lambda}_3 \\ \vdots \\ x^{\lambda}_c \\ \vdots \\ x^{\lambda}_C \end{bmatrix} = \begin{bmatrix} b^{\lambda}_1 \\ b^{\lambda}_2 \\ b^{\lambda}_3 \\ \vdots \\ b^{\lambda}_r \\ \vdots \\ b^{\lambda}_R \end{bmatrix} \quad (2)$$

suppose the weight coefficient matrix is $A^{\lambda}$, and the pixel column vector of the light field images is $B^{\lambda}$ and the voxel column vector of the control body is $X^{\lambda}$, and thus the formula (2) is expressed as $A^{\lambda}X^{\lambda}=B^{\lambda}$.

Based on characteristics of the tangent-circle imaging region of the light field camera, simplifying the correspondence equation set established in the above step by culling invalid pixels of the light field images and corresponding weight coefficients, a determination criterion for the invalid pixels is that:

the pixels in a region outside the tangent circle of the light field images are invalid pixels; by culling the invalid pixels in the pixel column vector $B^{\lambda}$ of the light field images and the invalid weight coefficients corresponding to the invalid pixels in the weight coefficient matrix $A^{\lambda}$, the equation set $A^{\lambda}X^{\lambda}=B^{\lambda}$ is simplified, and the light field tomographic reconstruction equation going through pretreatment is changed to $A^{\lambda}_2 X^{\lambda}=B^{\lambda}_2$;

the weight coefficient matrix is calculated by ray tracing method, and the calculation formula of the ray tracing method is as below:

$$\begin{bmatrix} x' \\ y' \\ \theta' \\ \varphi' \end{bmatrix} = \begin{bmatrix} 1 & 0 & f & 0 \\ 0 & 1 & 0 & f \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ -1/f & 0 & 1 & 0 \\ 0 & -1/f & 0 & 1 \end{bmatrix} \begin{bmatrix} 1 & 0 & S_1 & 0 \\ 0 & 1 & 0 & S_1 \\ 0 & 0 & 1 & 0 \\ 0 & 0 & 0 & 1 \end{bmatrix} \quad (3)$$

$$\begin{bmatrix} 1 & 0 & 0 & 0 \\ 0 & 1 & 0 & 0 \\ -1/F & 0 & 1 & 0 \\ 0 & -1/F & 0 & 1 \end{bmatrix} \begin{bmatrix} 1 & 0 & S_2 & 0 \\ 0 & 1 & 0 & S_2 \\ 0 & 0 & 1 & 0 \\ 0 & 0 & 0 & 1 \end{bmatrix} \begin{bmatrix} x \\ y \\ \theta \\ \varphi \end{bmatrix} + \begin{bmatrix} 0 \\ 0 \\ S_x/f \\ S_y/f \end{bmatrix}$$

wherein (x,y) refers to a coordinate of a light emitting source, (x',y') is a coordinate of a light incidence pixel, ($\theta,\varphi$) is a solid angle of emitted light, and ($\theta'$, $\varphi'$) is a solid angle of incident light; f is a focal length of the microlens unit, F is a focal length of the relay lens 1, $S_1$ is an object distance, $S_2$ is an image distance, and ($S_x$, $S_y$) is a displacement that a center of the microlens array deviates from the light axis of the imaging system;

tomographically reconstructing a three-dimensional spectral intensity of phosphorescent particles:

obtaining the preliminary reconstruction result $X^\lambda_1$ by tomographic reconstruction based on the Simultaneous Algebraic Reconstruction Technique (SART) algorithm, wherein the iteration calculation formula is as below:

$$x_p^{\lambda,(t+1)} = x_p^{\lambda,(t)} + \mu \frac{\sum_o \left( \frac{b_o^\lambda - \sum_{s=1}^{I \partial J \partial K} a_{o,s}^\lambda x_s^{\lambda,(t)}}{\sum_{s=1}^{I \partial J \partial K} a_{o,s}^\lambda} \right) a_{o,p}^\lambda}{\sum_o a_{o,p}^\lambda} \quad (4)$$

wherein t is a number of iterations, µ is a relaxation factor, p is a voxel number, b is a pixel gray value, o is a pixel number, $a_{o,p}^\lambda$ is a ratio of the gray contribution value of the p voxel for the o pixel to the λ spectral intensity value of the voxel, $\Sigma_{s=1}^{I J K} a_{o,s}^\lambda x_s^{\lambda,(t)}$ refers to a sum of a positive projections of the λ spectral intensity values of all non-zero voxels within a sight-line scope of the o pixel, $\Sigma_{s=1}^{I \| J \| K} a_{o,s}^\lambda$ refers to a sum of weight coefficients of the non-zero voxels for the o pixel within the sight-line scope of the o pixel, $b_o^{\lambda - \Sigma_{s=1}^{I J \| K} a_{o,s}^\lambda x_s^{\lambda,(t)}}$ refers to a difference between the gray value of the o pixel and the sum of the positive projections of the λ spectral intensity values of all non-zero voxels within the sight-line scope of the pixel.

By using the maximum inter-class variance method, binarization is performed on the preliminary reconstruction result $X_1$ and a voxel intensity value below a binarization threshold is set to zero to remove the overlapping effect of tracer particles.

The method of performing binarization on $X_2$, using the maximum inter-class variance method is as below:

Suppose the intensity threshold is τ, $X^\lambda_1$ voxel spectral intensities are divided into two classes A and B, where A is greater than τ, and B is less than τ; an $X^\lambda_1$ voxel spectral intensity distribution is traversed; when the variance of the classes A and B is maximal, the intensity threshold r is a binarization threshold of the $X^\lambda_1$.

The specific calculation method is below: firstly, a voxel spectral intensity data probability table of $X^\lambda_1$ is calculated based on frequency statistics function, where an ascending order of the intensities is $E_1, E_2, E_3 \ldots E_n$, and probabilities of the intensities are $p_1, p_2, p_3 \ldots p_n$, the intensity threshold is set to $E_k (1 \leq k \leq n)$, a probability of the class-A voxel spectral intensity is $p_A(k)$, and a mean value of the voxel spectral intensities is $m_A(k)$, a probability of the class-B voxel spectral intensity is $p_B(k)$, a mean value of the voxel spectral intensities is $m_B(k)$, and a mean value of the $X^\lambda_1$ voxel spectral intensities is $m_G$; in this case, the variance of the classes A and B is expressed below:

$$\sigma^2 = \frac{(m_G p_A(k) - E_k)^2}{p_A(k)(1 - p_A(k))} \quad (5)$$

$E_1, E_2, E_3 \ldots E_n$ are traversed one by one; when the value of the expression shown in the formula (5) is maximal, $E_k$ is the binarization threshold of the $X^\lambda_1$;

the voxel spectral intensities below $E_k$ in the $X^\lambda_1$ are set to zero to obtain $X^\lambda_2$ without particle overlap;

based on a correspondence between voxel column vector number and voxel three-dimensional coordinate, the $X^\lambda_2$ is reduced to a three-dimensional voxel matrix $X^\lambda_3$, and a voxel of center of gravity of a three-dimensional connected body within $X^\lambda_3$ is obtained by using Gaussian fitting.

the voxel of the center of gravity of any three-dimensional connected body $X^\lambda_3(i{:}i+\Delta i, J{:}j+\Delta j, k{:}k+\Delta k)$ in $X^\lambda_3$ is calculated in the following method:

slicing the three-dimensional connected body along a plane perpendicular to Z axis to obtain $X^\lambda_3(i{:}i+\Delta i, j{:}j+\Delta j, n)$:

$$X_3^\lambda(i:i+\Delta i, j:j+\Delta j, k:k+\Delta k) \to X_3(i:i+\Delta i, j:j+\Delta j, n) \quad (6)$$

wherein $k \leq n \leq k+\Delta k$;

by using two-dimensional Gaussian fitting function, identifying a center of mass of the $X^\lambda_3(i{:}i+\Delta i, j{:}j+\Delta j, n)$:

$$X_3^\lambda(x, y, n) = E^\lambda \exp\left( -\frac{(x-x_0)^2}{2\sigma_x^2} - \frac{(y-y_0)^2}{2\sigma_y^2} \right) \quad (7)$$

wherein $i \leq x \leq i+\Delta i$, $j \leq y \leq j+\Delta j$, $E^\lambda$ is an amplitude of λ spectral intensity Gaussian distribution of the voxel, $(x_0, y_0, n)$ is a coordinate of the voxel of the center of mass of a two-dimensional slice, and $\sigma_x$ and $\sigma_y$ are half-peak widths of the λ spectral intensity Gaussian distribution of the two-dimensional slice voxels;

obtaining the centers of mass of all slices by using the two-dimensional Gaussian fitting function for each slice of the three-dimensional connected body; performing one-dimensional Gaussian fitting on the λ spectral intensities of the voxels of all centers of mass to determine the center of gravity of the three-dimensional connected body:

$$X_3^\lambda(x_0, y_0, z) = E \exp\left( -\frac{(z-z_0)^2}{2\sigma_z^2} \right) \quad (8)$$

wherein $(x_0, y_0, z_0)$ is a coordinate of the voxel of the center of gravity of the three-dimensional connected body $X^\lambda_3(i{:}i+\Delta i, j{:}j+\Delta j, k{:}k+\Delta k)$, and $\sigma_z$ is a half-peak width of the λ spectral intensity Gaussian distribution of the voxels;

based on the center of gravity of the three-dimensional connected body, calculating the voxels of the centers of gravity of all three-dimensional connected bodies within the $X^\lambda_3$, marking three-dimensional coordinates of the voxels of the centers of gravity, culling all voxels other than the voxels of the centers of gravity in the $X^\lambda_3$ to obtain $X^\lambda_4$, reducing the $X^\lambda_4$ to a one-dimensional voxel column vector $X^\lambda_5$, and at the same time, simplifying $A^\lambda_2$ to $A^\lambda_3$, and changing the light field tomographic reconstruction equation to $A^\lambda_3 X^\lambda_5 = B^\lambda_2$; performing second-time SART tomographic reconstruction on $A^\lambda_3 X^\lambda_5 = B^\lambda_2$ to obtain $X^\lambda_6$ finally, based on a correspondence between three-dimensional coordinate of voxel of center of gravity and voxel column vector number, reducing the $X^{\lambda}_6$ to a three-dimensional flow field control body $X^{\lambda}_7$.

In the spectral light field imaging system provided by the present disclosure, a method of coupling a dichroic lens by a relay lens group in a cage type light field camera system is used, such that the light field data of the spectra of different bands are imaged on different image sensors to realize separation of the spectral data, avoiding the problems of loss of the single-spectrum light field data volume, aliasing of multispectral light field data, and change of the size of the spectral sub-aperture images along with the change of position of the imaging region due to aberration. When the wavelength of the collected spectra is changed, it is only required to change the dichroic lens and the corresponding filter, resulting in high system flexibility and convenient data processing.

Compared with the prior arts, the present disclosure has the following advantages.

(1) The spectral light field data volume does not decrease along with increase of spectrum number. In the existing spectral light field camera, a filter array is added to the diaphragm of the primary lens of the light field camera to realize collection of the multispectral light field data. Since the diaphragm aperture is equally divided by the spectral filters of the filter array, the light field data volume of each spectrum is in inverse proportion to spectrum number. In the present disclosure, a dichroic lens is added into the 1:1 relay lens group of the cage light field camera to achieve collection of the multispectral light field data, and the light field data volume of each spectrum is unchanged.

(2) There is no aliasing of spectral light field data. Limited by the process conditions of the filter array, the aliasing of the multispectral light field data is present at the boundary of the spectral sub-aperture images of the existing spectral light field camera, leading to invalidity of the spectral data at the sub-aperture image boundary. In the present disclosure, the light field data of different spectra are imaged on different image sensors, and thus there is no aliasing of the multispectral light field data.

(3) There is no problem of inconsistency of the sizes of the spectral sub-aperture images due to aberration. In the existing spectral light field camera, the multispectral light field data are imaged on a same image sensor. The larger the distance that the photographed region deviates from the light axis, the larger the aberration of the imaging system; and the sizes of the spectral sub-aperture images may be inconsistent. In the present disclosure, the light field data of different spectra are imaged on different image sensors and hence there is no problem of inconsistency of the sizes of the spectral sub-aperture images.

(4) The three-dimensional spectral intensity reconstruction flow is more convenient. In the existing spectral light field camera, the multispectral light field data are imaged on a same image sensor, and the light field data of each spectrum is obtained by extracting sub-aperture images. In the present disclosure, the light field data of different spectra are imaged on different image sensors, and the light field data on each image sensor is the light field data of the same spectrum. Therefore, there is no need to extract the sub-aperture images, bringing convenience to reconstruction calculation.

(5) The quality of the reconstruction result is higher. The position of the tracer particles and the spectral intensity ratio are used for inversion calculation of the flow field temperature field. Therefore, the accurate reconstruction of the three-dimensional spectral intensity ratio of the phosphorescent particle field is a core part of the flow field temperature field measurement. When the SART algorithm is used to tomographically reconstruct a light field imaging three-dimensional particle field, the reconstruction result is severely stretched along a depth direction of the control body, leading to large error of the intensity reconstruction result and severely affecting the accuracy of the flow field measurement result. In the present disclosure, based on the characteristics that the particle strength reconstruction result of the SART algorithm is approximately presented as Gaussian distribution along a stretch direction, in combination with the principle of calculating the center of gravity of the three-dimensional connected body using Gaussian fitting, there is provided a light field imaging three-dimensional particle field reconstruction method in combination with Gaussian fitting location technology and SART algorithm, By using SART algorithm, an initial three-dimensional particle field is reconstructed, and then by maximum inter-class variance method, the overlap effect of the tracer particles in the particle field is removed; next, based on Gaussian fitting principle, the voxels of the center of gravity of the connected body are located and stretched, and based on SART algorithm, the intensity value of the voxel of the center of gravity is reconstructed again, so as to reduce the intensity reconstruction error and increase the reconstruction quality.

(6) Measurement on the flow field transient three-dimensional temperature field is achieved. The existing laser-induced phosphorescence flow field temperature measurement system mainly uses a conventional imaging mode and can only obtain the multispectral images of the phosphorescent particles within the focal plane. Therefore, only transient measurement on the flow field two-dimensional temperature field can be achieved and the flow field transient three-dimensional temperature field cannot be obtained. The present disclosure provides a flow field transient three-dimensional temperature field measurement method combining the spectral light field imaging technology and the temperature measurement technology of the laser-induced phosphorescence intensity ratio method.

DETAILED DESCRIPTION OF THE EMBODIMENTS

The present disclosure will be detailed below in combination with drawings.

Figure 1:
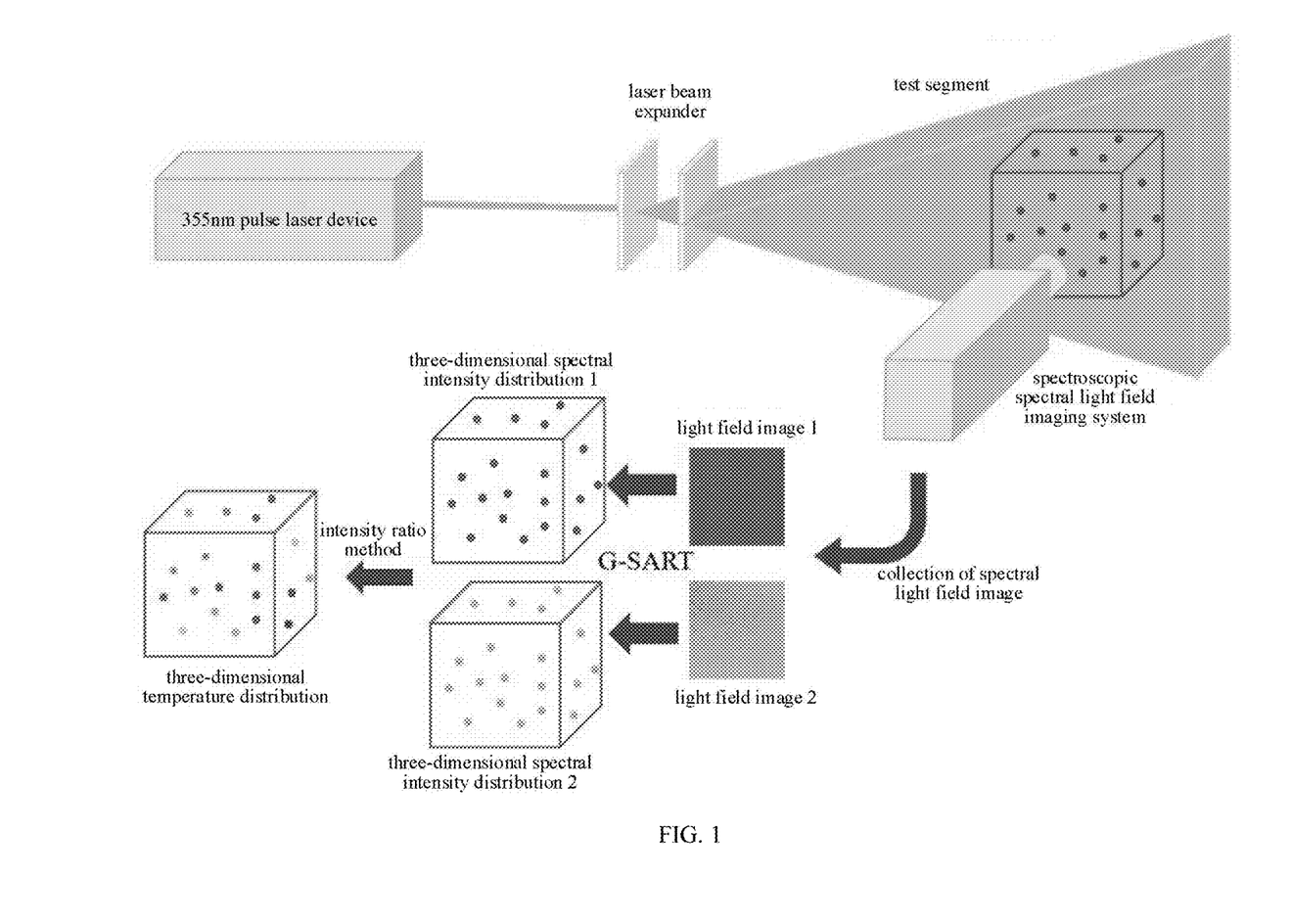
FIG. 1 shows a laser-induced phosphorescence flow field three-dimensional temperature field measurement method and system based on spectroscopic spectral light field camera.

As shown in FIG. 1, the present disclosure adopts the following technical solution: 355 nm laser is expanded into a body laser through a laser beam expander to excite phosphorescent particles in a to-be-measured flow field; two image sensors of the spectroscopic laser-induced phosphorescence spectral light field imaging system collect, at the same time, phosphorescent light field images of two different bands of the phosphorescent particles in the same to-be-measured flow field region; by using the spectral light-field imaging three-dimensional spectral intensity reconstruction algorithm combining Gaussian fitting location technology and SART algorithm in the present disclosure, the phosphorescent light field images of two bands can be solved at the same time, and a spectral intensity distribution of a three-dimensional phosphorescent particle field is obtained by reconstruction; by using intensity ratio method, a spectral intensity ratio of the three-dimensional phosphorescent particle field is calculated; based on the phosphorescent spectral intensity ratio, a temperature calibration result is obtained so as to solve a three-dimensional temperature field distribution of the to-be-measured flow field.

Based on the above technical solution, the present disclosure may be divided into three parts, which are (1) spectroscopic spectral light field imaging system structure; (2) the spectral light-field imaging three-dimensional spectral intensity reconstruction algorithm combining Gaussian fitting location technology and SART algorithm; (3) reconstruction of the flow field three-dimensional temperature field based on intensity ratio method.

Spectroscopic Spectral Light Field Imaging System Structure

Figure 2:
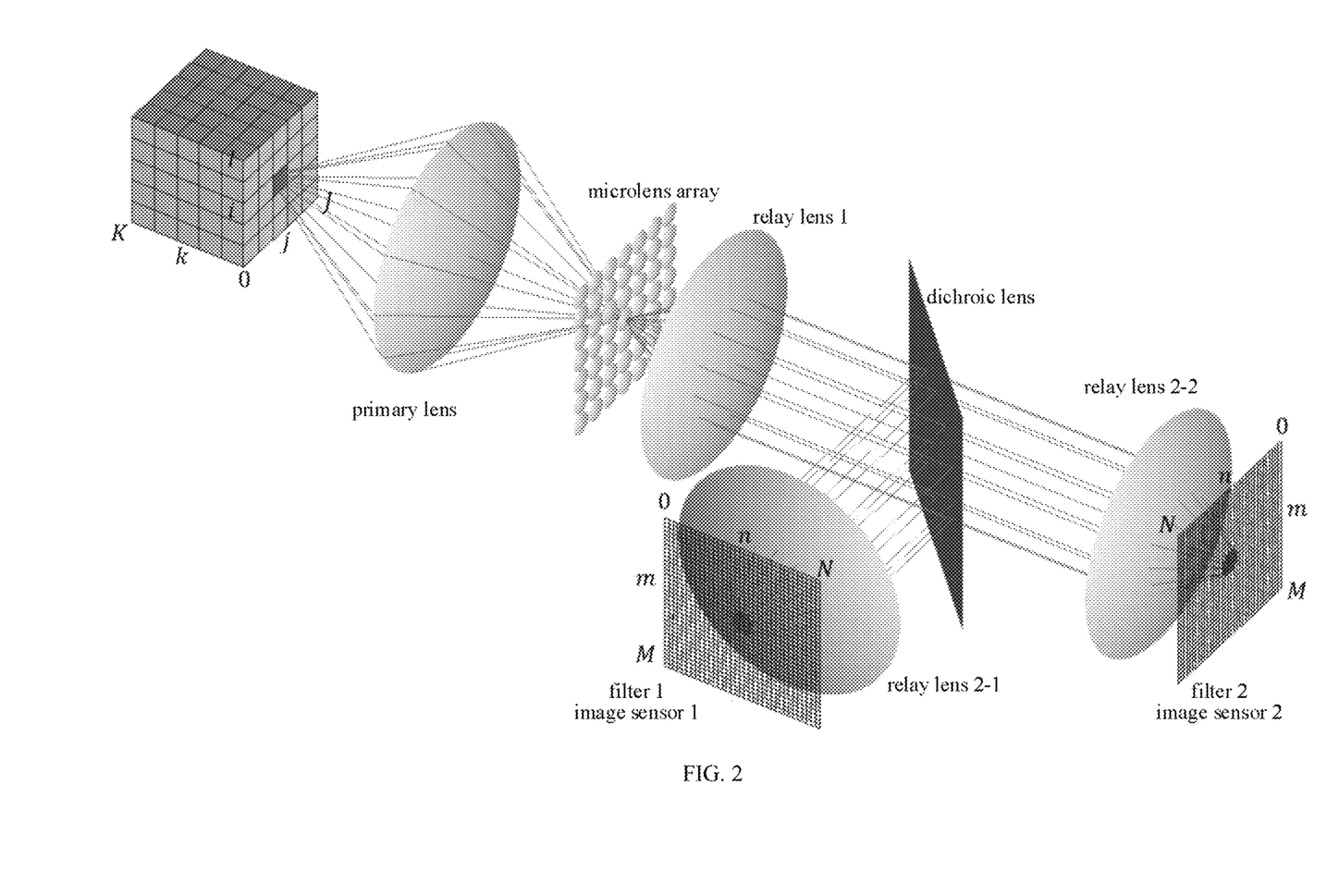
FIG. 2 is a structural schematic diagram illustrating a spectroscopic spectral light field imaging system.

The spectroscopic spectral light field imaging system structure as shown in FIG. 2 includes a primary lens, a microlens array, a relay lens 1, a dichroic lens, a relay lens 2-1, a relay lens 2-2, an image sensor 1, a filter 1, an image sensor 2 and a filter 2. The microlens array is located at an image plane of the primary lens; suppose a focal length of the microlens unit is f, and a focal length of the relay lens 1 is F; a distance between the relay lens 1 and an equivalent plane of the microlens array is f+F; the relay lens 1 together with the relay lens 2-1 and the relay lens 2-2 forms a 1:1 relay lens group imaging system on a spectral band 1 light path and a spectral band 2 light path respectively; the dichroic lens forms an included angle of 45° with a light axis; the image sensors 1 and 2 are located at focal planes of the relay lenses 2-1 and 2-2 respectively.

The Spectral Light-Field Imaging Three-Dimensional Spectral Intensity Reconstruction Algorithm Combining Gaussian Fitting Location Technology and SART Algorithm The position of the phosphorescent tracer particles and the spectral intensity ratio are used for inversion calculation of the flow field temperature field. Therefore, the solving calculation of the three-dimensional spectral intensity ratio of the phosphorescent particles is a core part of the flow field temperature measurement. In the present disclosure, firstly, a spectral light-field tomographic reconstruction model is constructed based on a correspondence of position of phosphorescent tracer particles, spectral intensity of phosphorescent tracer particles and light field image; based on ray tracing method, a weight coefficient matrix of the spectral light-field tomographic reconstruction model is calculated; then, in combination with the characteristics of the tangent-circle imaging region of the light field camera, the spectral light-field tomographic reconstruction model is simplified; finally, based on Gaussian fitting location technology, a stretching effect of the three-dimensional spectral intensity reconstruction result of the phosphorescent particles is weakened.

(1) Spectral Light-Field Tomographic Reconstruction Model

As shown in FIG. 2, lights emitted by a target object in different directions go through convergence of the primary lens, secondary imaging of the microlens array, beam expansion of the relay lens 1, and light splitting of the dichroic lens, where the light of a waveband λ1 is converged by the relay lens 2-1, and filtered by the filter 1 and then incident to different pixels of the image sensor 1 and also completes photoelectric conversion; likewise, the light of a waveband λ2 is converged by the relay lens 2-2, and filtered by the filter 2, and then incident to different pixels of the image sensor 2, and also completes photoelectric conversion. Pixel position information and pixel gray level information of the light field image 1 and the light field image 2 respectively correspond to direction information, wavelength information and spectral intensity information of the light emitted by the target object. Based on the correspondence, the correspondence of position of target object, spectral intensity of target object and light field image can be established.

$$b^\lambda_{(m,n)} = \sum_{(1,1,1)}^{(Ni,Nj,Nk)} a^\lambda_{(m,n),(i,j,k)} x^\lambda_{(i,j,k)} \qquad (1)$$

wherein λ refers to a spectral wavelength, (m,n) refers to a pixel coordinate, (i,j,k) refers to a voxel coordinate, $b^\lambda_{(m,n)}$ refers to a gray value of pixels (m,n) of λ spectral light field images, $x^\lambda_{(i,j,k)}$ refers to a λ spectral intensity value of the (i,j,k) voxel, $a^\lambda_{(m,n),(i,j,k)}$ refers to a ratio of a gray contribution value of the voxel (i,j,k) for the pixel (m,n) to a λ spectral intensity value of the voxel (i,j,k), which is also called weight coefficient.

In order to help calculation, three-dimensional discrete voxels of a control body are rearranged into a voxel column vector in an order of "row, then column and then vertical", and thus any original discrete voxel (i,j,k) is numbered (k−1)·I·J+(j−1)·I+i in the rearranged column vector; further, two-dimensional discrete pixels of the light field images are rearranged into a pixel column vector in an order of "row and then column" and thus any original pixel (m,n) is numbered (n−1)·M+m in the rearranged pixel column vector; r=(n−1)·M+m, c=(k−1)·I·J+(j−1)·I+i, R=M·N, C=I·J·K are obtained and thus a correspondence between voxel column vector of control body and pixel column vector of light field image is expressed as below:

$$\begin{bmatrix} a^\lambda_{1,1} & a^\lambda_{1,2} & a^\lambda_{1,3} & \cdots & \cdots & \cdots & a^\lambda_{1,C} \\ a^\lambda_{2,1} & a^\lambda_{2,2} & a^\lambda_{2,3} & \cdots & \cdots & \cdots & a^\lambda_{2,C} \\ a^\lambda_{3,1} & a^\lambda_{3,2} & a^\lambda_{3,3} & \cdots & \cdots & \cdots & a^\lambda_{3,C} \\ \vdots & \vdots & \vdots & \ddots & \cdots & \cdots & \vdots \\ \vdots & \vdots & \vdots & \vdots & a^\lambda_{r,c} & \cdots & \vdots \\ \vdots & \vdots & \vdots & \vdots & \vdots & \ddots & \vdots \\ a^\lambda_{R,1} & a^\lambda_{R,2} & a^\lambda_{R,3} & \cdots & \cdots & \cdots & a^\lambda_{R,C} \end{bmatrix} \begin{bmatrix} x^\lambda_1 \\ x^\lambda_2 \\ x^\lambda_3 \\ \vdots \\ x^\lambda_c \\ \vdots \\ x^\lambda_C \end{bmatrix} = \begin{bmatrix} b^\lambda_1 \\ b^\lambda_2 \\ b^\lambda_3 \\ \vdots \\ b^\lambda_r \\ \vdots \\ b^\lambda_R \end{bmatrix} \qquad (2)$$

Suppose the weight coefficient matrix is $A^\lambda$, and the pixel column vector of the light field images is $B^\lambda$ and the voxel column vector of the control body is $X^\lambda$, and thus the formula (2) is expressed as $A^\lambda X^\lambda = B^\lambda$. Based on the pixel gray level information $B^\lambda$ of the light field images, the voxel position and spectral intensity information of the control body tracer particles are reconstructed. These inverse problems are usually solved iteratively by using the SART algorithm with higher stability and parallelism. Since the SART algorithm needs to call the weight coefficient matrix repeatedly during a computation process and the light field weight coefficient matrix occupies large memory, the reconstruction process takes much time.

Figure 3:
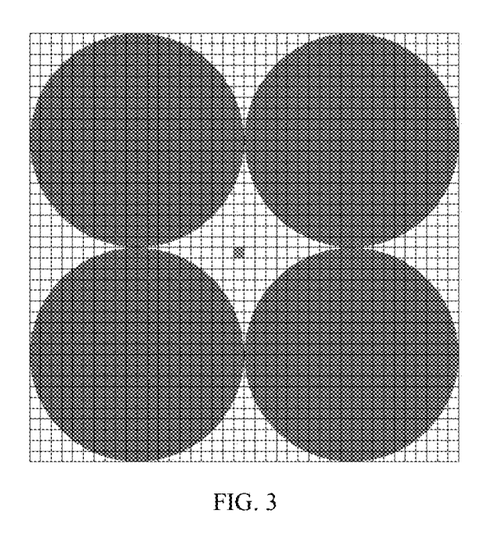
FIG. 3 is a schematic diagram illustrating a tangent-circle imaging region of a light field camera.

In order to reduce the occupied memory while avoid calculating the weight coefficient matrix repeatedly, the weight coefficient matrix and the equation set $A^\lambda X^\lambda=B^\lambda$ are simplified by culling the invalid pixels of the light field images and corresponding weight coefficients based on the characteristics of the tangent-circle imaging region of the light field camera (see FIG. 3), so as to reduce the time of tomographic computation. The determination criterion for the invalid pixels is that: no matter whether the photographed object is in focus, the image formed by the light field camera will not go beyond the tangent-circle region shown in FIG. 3. Therefore, the pixels outside the tangent circle of the light field images are invalid pixels. By culling the invalid pixels in $B^\lambda$ and the invalid weight coefficients corresponding to the invalid pixels in $A^\lambda$, the simplification of the equation set $A^\lambda X^\lambda=B^\lambda$ can be achieved and the tomographic computational amount is reduced, and thus the tomographic reconstruction time can be reduced. The light field tomographic reconstruction equation going through pretreatment is changed to $A^\lambda_2 X^\lambda = B^\lambda_2$.

(2) Acquisition of the Weight Coefficient Matrix

The weight coefficient matrix is calculated by the ray tracing method, where the calculation formula of the ray tracing method is as below:

$$\begin{bmatrix} x' \\ y' \\ \theta' \\ \varphi' \end{bmatrix} = \begin{bmatrix} 1 & 0 & f & 0 \\ 0 & 1 & 0 & f \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ -1/f & 0 & 1 & 0 \\ 0 & -1/f & 0 & 1 \end{bmatrix} \begin{bmatrix} 1 & 0 & S_1 & 0 \\ 0 & 1 & 0 & S_1 \\ 0 & 0 & 1 & 0 \\ 0 & 0 & 0 & 1 \end{bmatrix} \quad (3)$$

$$\begin{bmatrix} 1 & 0 & 0 & 0 \\ 0 & 1 & 0 & 0 \\ -1/F & 0 & 1 & 0 \\ 0 & -1/F & 0 & 1 \end{bmatrix} \begin{bmatrix} 1 & 0 & S_2 & 0 \\ 0 & 1 & 0 & S_2 \\ 0 & 0 & 1 & 0 \\ 0 & 0 & 0 & 1 \end{bmatrix} \begin{bmatrix} x \\ y \\ \theta \\ \varphi \end{bmatrix} + \begin{bmatrix} 0 \\ 0 \\ S_x/f \\ S_y/f \end{bmatrix}$$

where (x,y) refers to a coordinate of a light emitting source, (x',y') is a coordinate of a light incidence pixel, (θ, φ) is a solid angle of emitted light, and (θ', φ') is a solid angle of incident light; f is a focal length of the microlens unit, F is a focal length of the relay lens 1, $S_1$ is an object distance, $S_2$ is an image distance, and ($S_x$, $S_y$) is a displacement that a center of the microlens array deviates from the light axis of the imaging system.

(4) Tomographic Reconstruction of the Three-Dimensional Spectral Intensity of the Phosphorescent Particles For the presence of stretching problem in the reconstruction of the three-dimensional particle field of the spectral light-field imaging, by obtaining the center of gravity of the three-dimensional connected body by Gaussian fitting, the reconstruction result of the SART algorithm is optimized, and by culling the invalid voxels in $X^\lambda$ and invalid weight coefficients corresponding to the invalid voxels in $A^\lambda_2$, further simplification of the equation set $A^\lambda_2 X^\lambda = B^\lambda_2$ is achieved, so as to eliminate the stretching problem and improve the reconstruction accuracy of the three-dimensional position and intensity of the tracer particles.

Because the $X^\lambda$ is an unknown number, it is required to obtain a preliminary reconstruction result $X^\lambda_1$ by tomographic reconstruction based on SART algorithm, where the iteration calculation formula is as below:

$$x_p^{\lambda,(t+1)} = x_p^{\lambda,(t)} + \mu \frac{\sum_o \left( \frac{b_o^\lambda - \sum_{s=1}^{I \square J \square K} a_{o,s}^\lambda x_s^{\lambda,(t)}}{\sum_{s=1}^{I \square J \square K} a_{o,s}^\lambda} \right) a_{o,p}^\lambda}{\sum_o a_{o,p}^\lambda} \quad (4)$$

where t is a number of iterations, μ is a relaxation factor, p is a voxel number, b is a pixel gray value, o is a pixel number, $a_{o,p}^\lambda$ is a ratio of the gray contribution value of the p voxel for the o pixel to the λ spectral intensity value of the voxel, $\Sigma_{s=1}^{I\ J\ K} a_{o,s}^\lambda x_s^{\lambda,(t)}$ refers to a sum of a positive projections of the λ spectral intensity values of all non-zero voxels within a sight-line scope of the o pixel, $\Sigma_{s=1}^{I\square J\square K} a_{o,s}^\lambda$ refers to a sum of weight coefficients of the non-zero voxels for the o pixel within the sight-line scope of the o pixel, $b_o^{\lambda} - \Sigma_{s=1}^{I\square J\square K} a_{o,s}^\lambda x_s^{\lambda,(t)}$ refers to a difference between the gray value of the o pixel and the sum of the positive projections of the λ spectral intensity values of all non-zero voxels within the sight-line scope of the pixel.

Since the SART algorithm reconstruction result is severely stretched along the depth direction, the multiple-particle field reconstruction result may tend to have particle stretching and overlapping phenomena, namely, two or more tracer particles become a same three-dimensional connected body due to stretching effect. Before the center of gravity of the three-dimensional connected body is extracted by Gaussian fitting, the maximum inter-class variance method (also known as Nobuyuki Otsu, which is abbreviated as Otsu) is used herein to perform binarization on $X^\lambda_1$, and set the voxel intensity values below the binarization threshold to zero, so as to eliminate the overlap effect of the tracer particles. The method of calculating the $X^\lambda_1$ binarization threshold based on OTSU algorithm is as below: suppose the intensity threshold is τ, $X^\lambda_1$ voxel spectral intensities are divided into two classes A (greater than τ) and B (less than τ); an $X^\lambda_1$ voxel spectral intensity distribution is traversed; when the variance of the classes A and B is maximal, the intensity threshold τ is a binarization threshold of the $X^\lambda_1$. The specific calculation method is as below: firstly, a voxel spectral intensity data probability table of $X^\lambda_1$ is calculated based on frequency statistics function, where an ascending order of the intensities is $E_1, E_2, E_3 \ldots E_n$, and probabilities of the intensities are $p_1, p_2, p_3 \ldots p_n$; the intensity threshold is set to $E_k$ (1≤k≤n), a probability of the class-A voxel spectral intensity is $p_A(k)$, and a mean value of the voxel spectral intensities is $m_A(k)$, a probability of the class-B voxel spectral intensity is $p_B(k)$, a mean value of the voxel spectral intensities is $m_B(k)$, and a mean value of the $X^\lambda_1$ voxel spectral intensities is $m_G$; in this case, the variance of the classes A and B is expressed below:

$$\sigma^2 = \frac{(m_G p_A(k) - E_k)^2}{p_A(k)(1 - p_A(k))} \quad (5)$$

$E_1, E_2, E_3 \ldots E_n$ are traversed one by one; when the value of the expression shown in the formula (5) is maximal, $E_k$ is the binarization threshold of the $X^\lambda_1$.

The voxel spectral intensities below $E_k$ in the $X^\lambda_1$ are set to zero to obtain $X^\lambda_2$ without particle overlap.

Based on a correspondence between voxel column vector number and voxel three-dimensional coordinate, the $X^\lambda_2$ is reduced to a three-dimensional matrix $X^\lambda_3$, and a voxel of center of gravity of a three-dimensional connected body within $X^\lambda_3$ is obtained by using Gaussian fitting. The voxel of the center of gravity of any three-dimensional connected body $X^{\lambda}_3(i{:}i+\Delta i, j{:}j+\Delta j, k{:}k+\Delta k)$ in $X^{\lambda}_3$ is calculated in the following method: slicing the three-dimensional connected body along a plane perpendicular to Z axis to obtain $X^{\lambda}_3(i{:}i+\Delta i, j{:}j+\Delta j, n)$:

$$X^{\lambda}_3(i:i+\Delta i, j:j+\Delta j, k:k+\Delta k) \to X^{\lambda}_3(i:i+\Delta i, j:j+\Delta j, n) \quad (6)$$

wherein $k \leq n \leq k+\Delta k$; then by using two-dimensional Gaussian fitting function, identifying a center of mass of the $X^{\lambda}_3(i{:}i+\Delta i, j{:}j+\Delta j, n)$ with the expression below:

$$X^{\lambda}_3(x, y, n) = E^{\lambda} \exp\left(-\frac{(x-x_0)^2}{2\sigma_x^2} - \frac{(y-y_0)^2}{2\sigma_y^2}\right) \quad (7)$$

wherein $i \leq x \leq i+\Delta i$, $j \leq y \leq j+\Delta j$, $E^{\lambda}$ is an amplitude of a Gaussian distribution of the voxel spectral intensities, $(x_0, y_0, n)$ is a coordinate of the voxel of the center of mass of a two-dimensional slice, and $\sigma_x$ and $\sigma_y$ are half-peak widths of the spectral intensity Gaussian distribution of the two-dimensional slice voxels; obtaining the centers of mass of all slices by using the two-dimensional Gaussian fitting function for each slice of the three-dimensional connected body; performing one-dimensional Gaussian fitting on the spectral intensities of the voxels of all centers of mass to determine the center of gravity of the tree-dimensional connected body with the expression below:

$$X^{\lambda}_3(x_0, y_0, z) = E^{\lambda} \exp\left(-\frac{(z-z_0)^2}{2\sigma_z^2}\right) \quad (8)$$

wherein $(x_0, y_0, z_0)$ is a coordinate of the voxel of the center of gravity of the three-dimensional connected body $X^{\lambda}_3(i{:}i+\Delta i, j{:}j+\Delta j, k{:}k+\Delta k)$, and $\sigma_z$ is a half-peak width of the spectral intensity Gaussian distribution of the voxels.

Based on the calculation method of the center of gravity of the three-dimensional connected body, the voxels of the centers of gravity of all three-dimensional connected bodies within the $X^{\lambda}_3$ are calculated, three-dimensional coordinates of the voxels of the centers of gravity are marked, all voxels other than the voxels of the centers of gravity in the $X^{\lambda}_3$ are culled to obtain $X^{\lambda}_4$, the $X^{\lambda}_4$ is reduced to a one-dimensional voxel column vector $X^{\lambda}_5$, and at the same time, $A^{\lambda}_2$ is simplified to $A^{\lambda}_3$, and thus the light field tomographic reconstruction equation is changed to $A^{\lambda}_3 X^{\lambda}_5 = B^{\lambda}_2$. Second-time SART tomographic reconstruction is performed on $A^{\lambda}_3 X^{\lambda}_5 = B^{\lambda}_2$ to obtain $X^{\lambda}_6$. Finally, based on a correspondence between three-dimensional coordinate of voxel of center of gravity and voxel column vector number, the $X^{\lambda}_6$ is reduced to a three-dimensional flow field control body $X^{\lambda}_7$.

Figure 4:
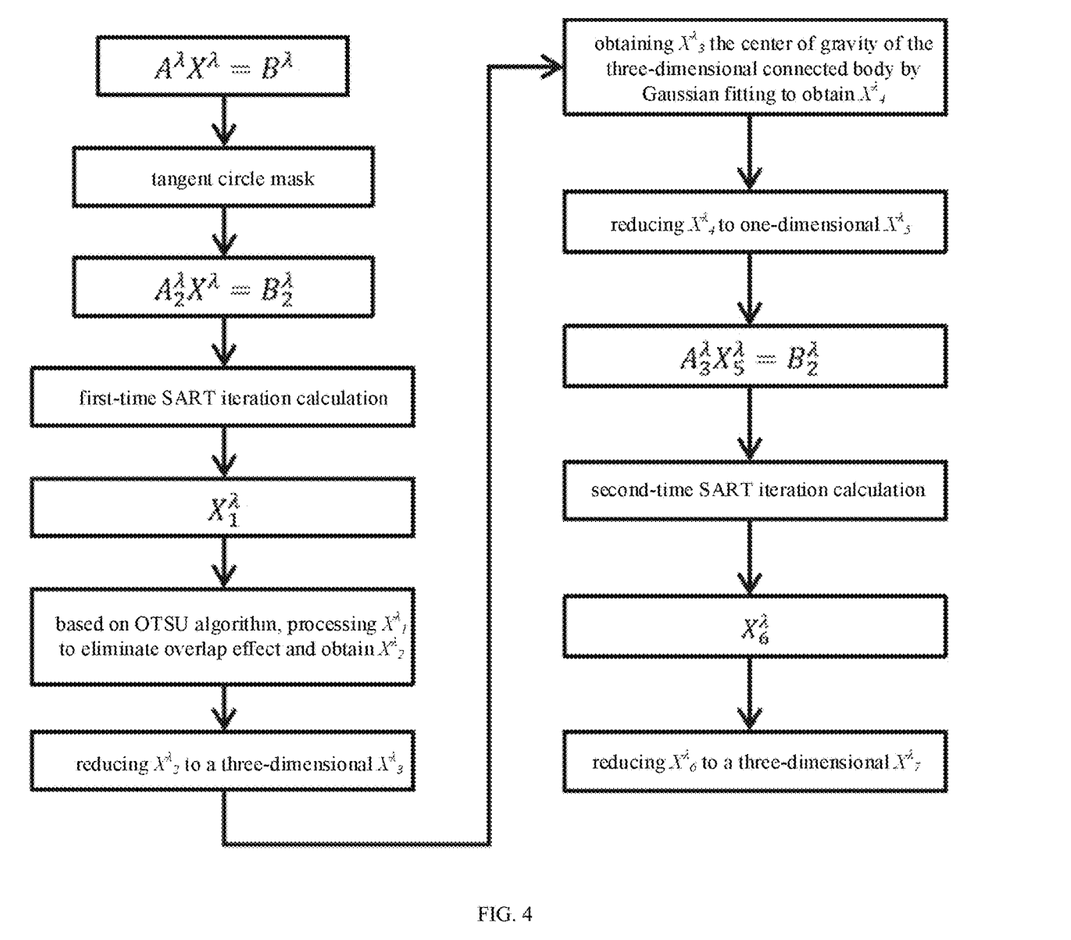
FIG. 4 is a flowchart illustrating a spectral light-field imaging three-dimensional spectral intensity reconstruction method combining Gaussian fitting location technology and SART algorithm.

In conclusion, the flow of the spectral light-field imaging three-dimensional spectral intensity reconstruction method combining Gaussian fitting location technology and SART algorithm is as shown in FIG. 4.

Based on the intensity ratio method, the flow field three-dimensional temperature field is reconstructed.

Based on the three-dimensional spectral intensity reconstruction flow, the light field images of the λ1 and λ2 phosphorescent spectra are solved respectively and the three-dimensional spectral intensities $X^{\lambda 1}_7$ and $X^{\lambda 2}_7$ of the λ1 and λ2 phosphorescent spectra of the phosphorescent particle field is reconstructed. A ratio is obtained for each non-zero voxel for $X^{\lambda 1}_7$ and $X^{\lambda 2}_7$ so as to obtain a spectral intensity ratio of the three-dimensional phosphorescent particle field, with the expression as below:

$$R_{(i,j,k)} = \frac{X^{\lambda 1}_{7,(i,j,k)}}{X^{\lambda 2}_{7,(i,j,k)}} \quad (9)$$

wherein $(i,j,k)$ is a voxel three-dimensional coordinate and $R_{(i,j,k)}$ is a phosphorescent spectral intensity ratio of the $(i,j,k)$ voxel.

By temperature calibration test, a relationship of phosphorescent spectral intensity ratio and temperature is obtained as below:

$$T_{(i,j,k)} = f(R_{(i,j,k)}) \quad (10)$$

wherein $T_{(i,j,k)}$ is a temperature of the $(i,j,k)$ voxel.

Based on the formula (10), a flow field transient three-dimensional temperature field is solved by using the spectral intensity ratio result $R_{(i,j,k)}$ of the three-dimensional phosphorescent particle field.

What is claimed is:

1. A laser-induced phosphorescence flow field three-dimensional temperature field measurement method based on a multispectral light field imaging system, wherein the multispectral light field imaging system comprises a primary lens, a microlens array, a first relay lens, a dichroic lens, a second relay lens, a third relay lens, a first image sensor, a first filter, a second image sensor and a second filter, wherein the microlens array is located at an image plane of the primary lens; a distance between the first relay lens and an equivalent plane of the microlens array is f+F, wherein f refers to a focal length of the microlens array, and F is a focal length of the first relay lens; the first relay lens together with the second relay lens and the third relay lens forms a 1:1 relay lens group imaging system on a spectral band first light path and a spectral band second light path respectively; the dichroic lens forms an included angle of 45° with a light axis; the first image sensor is located at a focal plane of the second relay lens, and the second image sensor is located at a focal plane of the third relay lens;

wherein the laser-induced phosphorescence flow field three-dimensional temperature field measurement method comprises:

sensing a light field with said multispectral light field imaging system such that light field images of the light field are collected by the first image sensor and the second image sensor respectively through the first relay lens and the dichroic lens and through one of the second relay lens and the third relay lens respectively;

based on the light field images, obtaining a three-dimensional spectral intensity distribution corresponding to the light field images; and based on the three-dimensional spectral intensity distribution, obtaining a three-dimensional temperature distribution by an intensity ratio method;

wherein based on the light field images, obtaining the three-dimensional spectral intensity distribution corresponding to the light field images comprises:

based on the light field images, establishing a correspondence equation set of a position of a target object, a spectral intensity of the target object, and a light field image;

based on characteristics of a tangent-circle imaging region of a light field camera, simplifying the correspondence equation set by culling invalid pixels of the light field images and corresponding weight coefficients;

based on first-time Simultaneous Algebraic Reconstruction Technique (SART) algorithm, performing preliminary reconstruction;

by using a maximum inter-class variance method, performing binarization on a preliminary reconstruction result, setting a voxel spectral intensity value below a binarization threshold to zero and obtaining a voxel column vector without particle overlap;

based on a correspondence between a voxel column vector number and a voxel three-dimensional coordinate, reducing the voxel column vector to a three-dimensional voxel matrix, and obtaining a voxel of center of gravity of a three-dimensional connected body within the three-dimensional voxel matrix by using Gaussian fitting;

based on the center of gravity of the three-dimensional connected body, calculating the voxels of the centers of gravity of all three-dimensional connected bodies within the three-dimensional voxel matrix, marking three-dimensional coordinates of the voxels of the centers of gravity, culling all voxels other than the voxels of the centers of gravity in the three-dimensional voxel matrix to obtain a simplified three-dimensional voxel matrix, reducing the simplified three-dimensional voxel matrix to a simplified voxel column vector, and synchronizing a weigh coefficient matrix to a simplified weight coefficient matrix, so as to obtain a simplified light field tomographic reconstruction equation;

performing second-time SART tomographic reconstruction on the simplified tomographic reconstruction equation to obtain a target voxel column vector; and based on a correspondence between three-dimensional coordinate of voxel of center of gravity and voxel column vector number, reducing the target voxel column vector to a target flow field control body three-dimensional voxel matrix.

2. The laser-induced phosphorescence flow field three-dimensional temperature field measurement method of claim 1, wherein by using the maximum inter-class variance method, performing binarization on the preliminary reconstruction result of the SART algorithm comprises the followings:

suppose an intensity threshold is $\tau$, the voxel spectral intensities of the preliminary reconstruction result are divided into classes A and B, wherein A is greater than $\tau$ and B is less than $\tau$, a voxel spectral intensity distribution of the preliminary reconstruction result is traversed; when a variance of the classes A and B is maximal, the intensity threshold $\tau$ is the binarization threshold of the preliminary reconstruction result.

3. The laser-induced phosphorescence flow field three-dimensional temperature field measurement method of claim 2, wherein in the step of, based on the characteristics of the tangent-circle imaging region of the light field camera, simplifying the correspondence equation set by culling the invalid pixels of the light field images and the corresponding weight coefficients, a determination criterion for the invalid pixels is that:

the pixels in a region outside the tangent circle of the light field images are invalid pixels; by culling the invalid pixels in the pixel column vector $B^\lambda$ of the light field images and the invalid weight coefficients corresponding to the invalid pixels in the weight coefficient matrix $A^\lambda$, the equation set $A^\lambda X^\lambda = B^\lambda$ is simplified, and the light field tomographic reconstruction equation going through pretreatment is changed to $A^\lambda_2 X^\lambda = B^\lambda_2$.

4. The laser-induced phosphorescence flow field three-dimensional temperature field measurement method of claim 1, wherein the correspondence equation set of the position of the target object, the spectral intensity of the target object, and the light field image is established as shown below:

$$b^\lambda_{(m,n)} = \sum_{(1,1,1)}^{(Ni,Nj,Nk)} a^\lambda_{(m,n),(i,j,k)} x^\lambda_{(i,j,k)} \qquad (1)$$

wherein $b_{(m,n)}^\lambda$ refers to a gray value of pixel (m,n) of $\lambda$ spectral light field images, $\lambda$ refers to a spectral wavelength, (m,n) refers to a pixel coordinate, $x_{(i,j,k)}^\lambda$ refers to a spectral intensity value of the (i,j,k) voxel, (i,j,k) refers to a voxel coordinate; $a_{(m,n),(i,j,k)}^\lambda$ refers to a ratio of a gray contribution value of the voxel (i,j,k) for the pixel (m,n) to a $\lambda$ spectral intensity value of the voxel (i,j,k), wherein $a_{(m,n),(i,j,k)}^\lambda$ is also called weight coefficient;

three-dimensional discrete voxels of a control body are rearranged into a voxel column vector in an order of "row, then column and then vertical", and thus any original discrete voxel (i,j,k) is numbered (k−1)·I·J+(j−1)·I+i in the rearranged column vector; two-dimensional discrete pixels of the light field images are rearranged into a pixel column vector in an order of "row and then column" and thus any original pixel (m,n) is numbered (n−1)·M+m in the rearranged pixel column vector; r=(n−1)·M+m, c=(k−1)·I·J+(j−1)·I+i, R=M·N, C=I·J·K are obtained and thus a correspondence between the voxel column vector of the control body and the pixel column vector of the light field image is expressed as below:

$$\begin{bmatrix} a^\lambda_{1,1} & a^\lambda_{1,2} & a^\lambda_{1,3} & \cdots & \cdots & \cdots & a^\lambda_{1,C} \\ a^\lambda_{2,1} & a^\lambda_{2,2} & a^\lambda_{2,3} & \cdots & \cdots & \cdots & a^\lambda_{2,C} \\ a^\lambda_{3,1} & a^\lambda_{3,2} & a^\lambda_{3,3} & \cdots & \cdots & \cdots & a^\lambda_{3,C} \\ \vdots & \vdots & \vdots & \ddots & \cdots & \cdots & \vdots \\ \vdots & \vdots & \vdots & \vdots & a^\lambda_{r,c} & \cdots & \vdots \\ \vdots & \vdots & \vdots & \vdots & \vdots & \ddots & \vdots \\ a^\lambda_{R,1} & a^\lambda_{R,2} & a^\lambda_{R,3} & \cdots & \cdots & \cdots & a^\lambda_{R,C} \end{bmatrix} \cdot \begin{bmatrix} x^\lambda_1 \\ x^\lambda_2 \\ x^\lambda_3 \\ \vdots \\ x^\lambda_c \\ \vdots \\ x^\lambda_c \end{bmatrix} = \begin{bmatrix} b^\lambda_1 \\ b^\lambda_2 \\ b^\lambda_3 \\ \vdots \\ b^\lambda_r \\ \vdots \\ b^\lambda_R \end{bmatrix} \qquad (2)$$

suppose the weight coefficient matrix is $A^\lambda$, and the pixel column vector of the light field images is $B^\lambda$ and the voxel column vector of the control body is $X^\lambda$, and thus the formula (2) is expressed as $A^\lambda X^\lambda = B^\lambda$.

5. The laser-induced phosphorescence flow field three-dimensional temperature field measurement method of claim 4, wherein the weight coefficient matrix is calculated by a ray tracing method, and a calculation formula of the ray tracing method is as below:

$$\begin{bmatrix} x' \\ y' \\ \theta' \\ \varphi' \end{bmatrix} = \begin{bmatrix} 1 & 0 & f & 0 \\ 0 & 1 & 0 & f \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ -1/f & 0 & 1 & 0 \\ 0 & -1/f & 0 & 1 \end{bmatrix} \begin{bmatrix} 1 & 0 & S_1 & 0 \\ 0 & 1 & 0 & S_1 \\ 0 & 0 & 1 & 0 \\ 0 & 0 & 0 & 1 \end{bmatrix} \quad (3)$$

$$\begin{bmatrix} 1 & 0 & 0 & 0 \\ 0 & 1 & 0 & 0 \\ -1/F & 0 & 1 & 0 \\ 0 & -1/F & 0 & 1 \end{bmatrix} \begin{bmatrix} 1 & 0 & S_2 & 0 \\ 0 & 1 & 0 & S_2 \\ 0 & 0 & 1 & 0 \\ 0 & 0 & 0 & 1 \end{bmatrix} \begin{bmatrix} x \\ y \\ \theta \\ \varphi \end{bmatrix} + \begin{bmatrix} 0 \\ 0 \\ S_x/f \\ S_y/f \end{bmatrix}$$

wherein (x,y) refers to a coordinate of a light emitting source, (x',y') is a coordinate of a light incidence pixel, (θ, φ) is a solid angle of emitted light, and (θ', φ') is a solid angle of incident light; f is a focal length of a microlens unit, F is a focal length of the first relay lens, $S_1$ is an object distance, $S_2$ is an image distance, and ($S_x$, $S_y$) is a displacement that a center of the microlens array deviates from the light axis of the multispectral light field imaging system.

6. The laser-induced phosphorescence flow field three-dimensional temperature field measurement method of claim 5, wherein performing preliminary reconstruction based on the first-time SART algorithm comprises:
obtaining the preliminary reconstruction result $X^\lambda_1$ by tomographic reconstruction based on the SART algorithm, wherein a iteration calculation formula is as below:

$$x_p^{\lambda,(t+1)} = x_p^{\lambda,(t)} + \mu \frac{\sum_o \left( \frac{b_o^\lambda - \sum_{s=1}^{I\cdot J \cdot K} a_{o,s}^\lambda x_s^{\lambda,(t)}}{\sum_{s=1}^{I\cdot J \cdot K} a_{o,s}^\lambda} \right) a_{o,p}^\lambda}{\sum_o a_{o,p}^\lambda} \quad (4)$$

wherein t is a number of iterations, µ is a relaxation factor, p is a voxel number, b is a pixel gray value, o is a pixel number, $a_{o,p}^\lambda$ is a ratio of the gray contribution value of the p voxel for the o pixel to the λ spectral intensity value of the voxel, $\Sigma_{s=1}^{I\cdot J\cdot K} a_{o,s}^\lambda x_s^{\lambda,(t)}$ refers to a sum of positive projections of the λ spectral intensity values of all non-zero voxels within a sight-line scope of the o pixel, $\Sigma_{s=1}^{I\cdot J\cdot K} a_{o,s}^\lambda$ refers to a sum of weight coefficients of the non-zero voxels for the o pixel within the sight-line scope of the o pixel, $b_o^\lambda - \Sigma_{s=1}^{I\cdot J\cdot K} a_{o,s}^\lambda x_s^{\lambda,(t)}$ refers to a difference between the gray value of the o pixel and the sum of the positive projections of the λ spectral intensity values of all non-zero voxels within the sight-line scope of the pixel.

7. The laser-induced phosphorescence flow field three-dimensional temperature field measurement method of claim 6, wherein the voxel of the center of gravity of any three-dimensional connected body $X^\lambda_3(i:i+\Delta i, j:j+\Delta j, k:k+\Delta k)$ in $X^\lambda_3$ is calculated in the following method:
slicing the three-dimensional connected body along a plane perpendicular to Z axis to obtain $X^\lambda_3(i:i+\Delta i, j:j+\Delta j, n)$:

$$X_3^\lambda(i:i+\Delta i, j:j+\Delta j, k:k+\Delta k) \to X_3(i:i+\Delta i, j:j+\Delta j, n) \quad (6)$$

wherein k≤n≤k+Δk;
by using two-dimensional Gaussian fitting function, identifying a center of mass of the $X^\lambda_3(i:i+\Delta i, j:j+\Delta j, n)$:

$$X_3^\lambda(x, y, n) = E^\lambda \exp\left( -\frac{(x-x_0)^2}{2\sigma_x^2} - \frac{(y-y_0)^2}{2\sigma_y^2} \right) \quad (7)$$

wherein i≤x≤i+Δi, j≤y≤j+Δj, $E^\lambda$ is an amplitude of λ spectral intensity Gaussian distribution of the voxel, ($x_0$, $y_0$, n) is a coordinate of the voxel of the center of mass of a two-dimensional slice, and $\sigma_x$ and $\sigma_y$ are half-peak widths of the λ spectral intensity Gaussian distribution of the two-dimensional slice voxels;
obtaining the centers of mass of all slices by using the two-dimensional Gaussian fitting function for each slice of the three-dimensional connected body; performing one-dimensional Gaussian fitting on the λ spectral intensities of the voxels of all centers of mass to determine the center of gravity of the three-dimensional connected body:

$$X_3^\lambda(x_0, y_0, z) = E \exp\left( -\frac{(z-z_0)^2}{2\sigma_z^2} \right) \quad (8)$$

wherein ($x_0$, $y_0$, $z_0$) is a coordinate of the voxel of the center of gravity of the three-dimensional connected body $X^\lambda_3(i:i+\Delta i, j:j+\Delta j, k:k+\Delta k)$, and $\sigma_z$ is a half-peak width of the λ spectral intensity Gaussian distribution of the voxels.

8. The laser-induced phosphorescence flow field three-dimensional temperature field measurement method of claim 6, wherein based on the three-dimensional spectral intensity distribution, obtaining the three-dimensional temperature distribution by the intensity ratio method comprises:
for the three-dimensional spectral intensities $X^{\lambda 1}_7$ and $X^{\lambda 2}_7$ of λ1 and λ2 phosphorescent spectra, obtaining a ratio for each non-zero voxel so as to obtain a spectral intensity ratio of a three-dimensional phosphorescent particle field:

$$R_{(i,j,k)} = \frac{X^{\lambda 1}_{7,(i,j,k)}}{X^{\lambda 2}_{7,(i,j,k)}} \quad (9)$$

wherein (i,j,k) is a voxel three-dimensional coordinate and $R_{(i,j,k)}$ is a phosphorescent spectral intensity ratio of the (i,j,k) voxel;
by temperature calibration test, obtaining a relationship of phosphorescent spectral intensity ratio and temperature as below:

$$T_{(i,j,k)} = f(R_{(i,j,k)}) \quad (10)$$

wherein $T_{(i,j,k)}$ is a temperature of the (i,j,k) voxel;
based on the formula (10), solving a flow field transient three-dimensional temperature field by using the spectral intensity ratio result $R_{(i,j,k)}$ of the three-dimensional phosphorescent particle field.

9. A laser-induced phosphorescence flow field three-dimensional temperature field measurement system, comprising a pulse laser device, a laser beam expander, a spectral light field image collection system, and an image processing system, wherein the image processing system calculates a flow field transient three-dimensional temperature field based on images collected by the spectral light field image collection system by steps of the laser-induced phosphorescence flow field three-dimensional temperature field measurement method of claim 1.

10. The laser-induced phosphorescence flow field three-dimensional temperature field measurement system of claim 9, wherein in the laser-induced phosphorescence flow field three-dimensional temperature field measurement method, by using the maximum inter-class variance method, performing binarization on the preliminary reconstruction result of the SART algorithm comprises the followings:

suppose an intensity threshold is $\tau$, the voxel spectral intensities of the preliminary reconstruction result are divided into classes A and B, wherein A is greater than $\tau$ and B is less than $\tau$, a voxel spectral intensity distribution of the preliminary reconstruction result is traversed; when a variance of the classes A and B is maximal, the intensity threshold $\tau$ is the binarization threshold of the preliminary reconstruction result.

11. The laser-induced phosphorescence flow field three-dimensional temperature field measurement system of claim 9, wherein in the laser-induced phosphorescence flow field three-dimensional temperature field measurement method, the correspondence equation set of the position of the target object, the spectral intensity of the target object, and the light field image is established as shown below:

$$b^\lambda_{(m,n)} = \sum_{(1,1,1)}^{(Ni,Nj,Nk)} a^\lambda_{(m,n),(i,j,k)} x^\lambda_{(i,j,k)} \quad (1)$$

wherein $b_{(m,n)}{}^\lambda$ refers to a gray value of pixel (m,n) of $\lambda$ spectral light field images, $\lambda$ refers to a spectral wavelength, (m,n) refers to a pixel coordinate, $x_{(i,j,k)}{}^\lambda$ refers to a $\lambda$ spectral intensity value of the (i,j,k) voxel, (i,j,k) refers to a voxel coordinate; $a_{(m,n),(i,j,k)}{}^\lambda$ refers to a ratio of a gray contribution value of the voxel (i,j,k) for the pixel (m,n) to a $\lambda$ spectral intensity value of the voxel (i,j,k), wherein $a_{(m,n),(i,j,k)}{}^\lambda$ is also called weight coefficient;

three-dimensional discrete voxels of a control body are rearranged into a voxel column vector in an order of "row, then column and then vertical", and thus any original discrete voxel (i,j,k) is numbered (k−1)·I·J+(j−1)·I+i in the rearranged column vector; two-dimensional discrete pixels of the light field images are rearranged into a pixel column vector in an order of "row and then column" and thus any original pixel (m,n) is numbered (n−1)·M+m in the rearranged pixel column vector; r=(n−1)·M+m, c=(k−1)·I·J+(j−1)·I+i, R=M·N, C=I·J·K are obtained and thus a correspondence between the voxel column vector of the control body and the pixel column vector of the light field image is expressed as below:

$$\begin{bmatrix} a^\lambda_{1,1} & a^\lambda_{1,2} & a^\lambda_{1,3} & \cdots & \cdots & \cdots & a^\lambda_{1,C} \\ a^\lambda_{2,1} & a^\lambda_{2,2} & a^\lambda_{2,3} & \cdots & \cdots & \cdots & a^\lambda_{2,C} \\ a^\lambda_{3,1} & a^\lambda_{3,2} & a^\lambda_{3,3} & \cdots & \cdots & \cdots & a^\lambda_{3,C} \\ \vdots & \vdots & \vdots & \ddots & \cdots & \cdots & \vdots \\ \vdots & \vdots & \vdots & \vdots & a^\lambda_{r,c} & \cdots & \vdots \\ \vdots & \vdots & \vdots & \vdots & \vdots & \ddots & \vdots \\ a^\lambda_{R,1} & a^\lambda_{R,2} & a^\lambda_{R,3} & \cdots & \cdots & \cdots & a^\lambda_{R,C} \end{bmatrix} \cdot \begin{bmatrix} x^\lambda_1 \\ x^\lambda_2 \\ x^\lambda_3 \\ \vdots \\ x^\lambda_c \\ \vdots \\ x^\lambda_C \end{bmatrix} = \begin{bmatrix} b^\lambda_1 \\ b^\lambda_2 \\ b^\lambda_3 \\ \vdots \\ b^\lambda_r \\ \vdots \\ b^\lambda_R \end{bmatrix} \quad (2)$$

suppose the weight coefficient matrix is $A^\lambda$, and the pixel column vector of the light field images is $B^\lambda$ and the voxel column vector of the control body is $X^\lambda$, and thus the formula (2) is expressed as $A^\lambda X^\lambda = B^\lambda$.

12. The laser-induced phosphorescence flow field three-dimensional temperature field measurement system of claim 11, wherein in the laser-induced phosphorescence flow field three-dimensional temperature field measurement method, the weight coefficient matrix is calculated by a ray tracing method, and a calculation formula of the ray tracing method is as below:

$$\begin{bmatrix} x' \\ y' \\ \theta' \\ \varphi' \end{bmatrix} = \begin{bmatrix} 1 & 0 & f & 0 \\ 0 & 1 & 0 & f \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ -1/f & 0 & 1 & 0 \\ 0 & -1/f & 0 & 1 \end{bmatrix} \begin{bmatrix} 1 & 0 & S_1 & 0 \\ 0 & 1 & 0 & S_1 \\ 0 & 0 & 1 & 0 \\ 0 & 0 & 0 & 1 \end{bmatrix} \quad (3)$$

$$\begin{bmatrix} 1 & 0 & 0 & 0 \\ 0 & 1 & 0 & 0 \\ -1/F & 0 & 1 & 0 \\ 0 & -1/F & 0 & 1 \end{bmatrix} \begin{bmatrix} 1 & 0 & S_2 & 0 \\ 0 & 1 & 0 & S_2 \\ 0 & 0 & 1 & 0 \\ 0 & 0 & 0 & 1 \end{bmatrix} \begin{bmatrix} x \\ y \\ \theta \\ \varphi \end{bmatrix} + \begin{bmatrix} 0 \\ 0 \\ S_x/f \\ S_y/f \end{bmatrix}$$

wherein (x,y) refers to a coordinate of a light emitting source, (x',y') is a coordinate of a light incidence pixel, ($\theta$, $\varphi$) is a solid angle of emitted light, and ($\theta'$, $\varphi'$) is a solid angle of incident light; f is a focal length of a microlens unit, F is a focal length of the first relay lens, $S_1$ is an object distance, $S_2$ is an image distance, and ($S_x$, $S_y$) is a displacement that a center of the microlens array deviates from the light axis of the multispectral light field imaging system.

13. The laser-induced phosphorescence flow field three-dimensional temperature field measurement system of claim 12, wherein in the laser-induced phosphorescence flow field three-dimensional temperature field measurement method, performing preliminary reconstruction based on the first-time SART algorithm comprises:

obtaining the preliminary reconstruction result $X^\lambda_1$ by tomographic reconstruction based on the SART algorithm, wherein a iteration calculation formula is as below:

$$x^{\lambda,(t+1)}_p = x^{\lambda,(t)}_p + \mu \frac{\sum_o \left( \frac{b^\lambda_o - \sum_{s=1}^{I \cdot J \cdot K} a^\lambda_{o,s} x^{\lambda,(t)}_s}{\sum_{s=1}^{I \cdot J \cdot K} a^\lambda_{o,s}} \right) a^\lambda_{o,p}}{\sum_o a^\lambda_{o,p}} \quad (4)$$

wherein t is a number of iterations, $\mu$ is a relaxation factor, p is a voxel number, b is a pixel gray value, o is a pixel number, $a_{o,p}{}^\lambda$ is a ratio of the gray contribution value of the p voxel for the o pixel to the $\lambda$ spectral intensity value of the voxel, $\Sigma_{s=1}^{I \cdot J \cdot K} a^\lambda_{o,s} x^{\lambda,(t)}_s$ refers to a sum of positive projections of the $\lambda$ spectral intensity values of all non-zero voxels within a sight-line scope of the o pixel, $\Sigma_{s=1}^{I \cdot J \cdot K} a^\lambda_{o,s}$ refers to a sum of weight coefficients of the non-zero voxels for the o pixel within the sight-line scope of the o pixel, $b^\lambda_o - \Sigma_{s=1}^{I \cdot J \cdot K} a^\lambda_{o,s} x^{\lambda,(t)}_s$ refers to a difference between the gray value of the o pixel and the sum of the positive projections of the $\lambda$ spectral intensity values of all non-zero voxels within the sight-line scope of the pixel.

14. The laser-induced phosphorescence flow field three-dimensional temperature field measurement system of claim 13, wherein in the laser-induced phosphorescence flow field three-dimensional temperature field measurement method, the voxel of the center of gravity of any three-dimensional connected body $X^\lambda_3(i{:}i{+}\Delta i, j{:}j{+}\Delta j, k{:}k{+}\Delta k)$ in $X^\lambda_3$ is calculated in the following method:

slicing the three-dimensional connected body along a plane perpendicular to Z axis to obtain $X^\lambda_3(i{:}i{+}\alpha i, j{:}j{+}\alpha j, n)$:

$$X^\lambda_3(i{:}i+\Delta i, j{:}j+\Delta j, k{:}k+\Delta k) \to X_3(i{:}i+\Delta i, j{:}j+\Delta j, n) \qquad (6)$$

wherein $k \le n \le k+\Delta k$;

by using two-dimensional Gaussian fitting function, identifying a center of mass of the $X^\lambda_3(i{:}i{+}\Delta i, j{:}j{+}\Delta j, n)$:

$$X^\lambda_3(x, y, n) = E^\lambda \exp\left(-\frac{(x-x_0)^2}{2\sigma_x^2} - \frac{(y-y_0)^2}{2\sigma_y^2}\right) \qquad (7)$$

wherein $i \le x \le i+\Delta i$, $j \le y \le j+\Delta j$, $E^\lambda$ is an amplitude of $\lambda$ spectral intensity Gaussian distribution of the voxel, $(x_0, y_0, n)$ is a coordinate of the voxel of the center of mass of a two-dimensional slice, and $\sigma_x$ and $\sigma_y$ are half-peak widths of the $\lambda$ spectral intensity Gaussian distribution of the two-dimensional slice voxels;

obtaining the centers of mass of all slices by using the two-dimensional Gaussian fitting function for each slice of the three-dimensional connected body; performing one-dimensional Gaussian fitting on the $\lambda$ spectral intensities of the voxels of all centers of mass to determine the center of gravity of the three-dimensional connected body:

$$X^\lambda_3(x_0, y_0, z) = E \exp\left(-\frac{(z-z_0)^2}{2\sigma_z^2}\right) \qquad (8)$$

wherein $(x_0, y_0, z_0)$ is a coordinate of the voxel of the center of gravity of the three-dimensional connected body $X^\lambda_3(i{:}i{+}\Delta i, j{:}j{+}\Delta j, k{:}k{+}\Delta k)$, and $\sigma_z$ is a half-peak width of the $\lambda$ spectral intensity Gaussian distribution of the voxels.

15. The laser-induced phosphorescence flow field three-dimensional temperature field measurement system of claim 13, wherein in the laser-induced phosphorescence flow field three-dimensional temperature field measurement method, based on the three-dimensional spectral intensity distribution, obtaining the three-dimensional temperature distribution by the intensity ratio method comprises:

for the three-dimensional spectral intensities $X^{\lambda 1}_7$ and $X^{\lambda 2}_7$ of $\lambda 1$ and $\lambda 2$ phosphorescent spectra, obtaining a ratio for each non-zero voxel so as to obtain a spectral intensity ratio of a three-dimensional phosphorescent particle field:

$$R_{(i,j,k)} = \frac{X^{\lambda 1}_{7,(i,j,k)}}{X^{\lambda 2}_{7,(i,j,k)}} \qquad (9)$$

wherein $(i,j,k)$ is a voxel three-dimensional coordinate and $R_{(i,j,k)}$ is a phosphorescent spectral intensity ratio of the $(i,j,k)$ voxel;

by temperature calibration test, obtaining a relationship of phosphorescent spectral intensity ratio and temperature as below:

$$T_{(i,j,k)} = f(R_{(i,j,k)}) \qquad (10)$$

wherein $T_{(i,j,k)}$ is a temperature of the $(i,j,k)$ voxel;

based on the formula (10), solving a flow field transient three-dimensional temperature field by using the spectral intensity ratio result $R_{(i,j,k)}$ of the three-dimensional phosphorescent particle field.

* * * * *